(12) United States Patent
Mickael et al.

(10) Patent No.: US 9,885,796 B2
(45) Date of Patent: Feb. 6, 2018

(54) MONOPOLE ACOUSTIC TRANSMITTER RING COMPRISING PIEZOELECTRIC MATERIAL

(71) Applicant: Precision Energy Services, Inc., Fort Worth, TX (US)

(72) Inventors: Medhat W. Mickael, Sugar Land, TX (US); Dale A. Jones, Houston, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 318 days.

(21) Appl. No.: 14/810,916

(22) Filed: Jul. 28, 2015

(65) Prior Publication Data

US 2015/0331133 A1 Nov. 19, 2015

Related U.S. Application Data

(60) Division of application No. 12/943,171, filed on Nov. 10, 2010, now Pat. No. 9,121,970, and a continuation-in-part of application No. 12/179,175, filed on Jul. 24, 2008, now abandoned.

(51) Int. Cl.
*G01V 1/00* (2006.01)
*G01V 1/44* (2006.01)

(52) U.S. Cl.
CPC .................... *G01V 1/44* (2013.01)

(58) Field of Classification Search
CPC ........................................ G01V 1/44
See application file for complete search history.

(56) References Cited

U.S. PATENT DOCUMENTS

| | | |
|---|---|---|
| 5,027,331 A | 6/1991 | Winbow et al. |
| 5,043,952 A | 8/1991 | Hoyle et al. |
| 5,387,767 A | 2/1995 | Aron |
| 5,644,186 A | 7/1997 | Birchak |
| 5,753,812 A | 5/1998 | Aron |
| 6,102,152 A | 8/2000 | Masino |
| 6,147,932 A | 11/2000 | Drumheller |
| 6,213,250 B1 | 4/2001 | Wisniewski |

(Continued)

OTHER PUBLICATIONS

U.S. Appl. No. 11/780,957, filed Jul. 20, 2007, Mickael.

(Continued)

*Primary Examiner* — Krystine Breier
(74) *Attorney, Agent, or Firm* — Blank Rome LLP

(57) ABSTRACT

A monopole acoustic transmitter for logging-while-drilling comprising as a ring that comprises one or more piezoelectric arc segments. The ring is oriented in a plane whose normal is essentially coincident with the major axis of a logging tool in which it is disposed. The ring disposed within a recess on the outer surface of a short, cylindrical insert. The insert is inserted into a drill collar, rather than into the wall of the collar. The ring can comprise a continuous ring of piezoelectric material, or alternately arc segments or active ring segments of piezoelectric ceramic bonded to segments of other materials such as alumina to increase the frequency or heavy metals such as tungsten to reduce the frequency. The material and dimensions of the material used in-between the piezoelectric segments is chosen to alter the frequency of the ring.

11 Claims, 4 Drawing Sheets

(56) References Cited

U.S. PATENT DOCUMENTS

| | | | |
|---|---|---|---|
| 6,568,486 B1 * | 5/2003 | George | G01V 1/44 175/45 |
| 6,614,360 B1 | 9/2003 | Leggett et al. | |
| 6,631,327 B2 | 10/2003 | Hsu | |
| 7,372,777 B2 | 5/2008 | Hurst et al. | |
| 7,460,435 B2 | 12/2008 | Garcia-Osuna et al. | |
| 2004/0095847 A1 * | 5/2004 | Hassan | G01H 5/00 367/25 |

OTHER PUBLICATIONS

U.S. Appl. No. 11/943,185, filed Jul. 20, 2007, Jones.
Inoue, "Low Frequency Flextensional Piezoelectric Transmitter With Displacement Amplifier," IEEE 1987, pp. 765-770.

* cited by examiner

MONOPOLE ACOUSTIC TRANSMITTER RING COMPRISING PIEZOELECTRIC MATERIAL

CROSS REFERENCE TO RELATED APPLICATION

This application is a divisional application of U.S. application Ser. No. 12/943,171, filed Nov. 10, 2010, which is a continuation application of U.S. application Ser. No. 12/179,175, filed Jul. 24, 2008, both of which are incorporated by reference in their entirety, and to which priority is claimed.

FIELD OF THE INVENTION

This invention is related to systems for measuring an acoustic property of material penetrated by a well borehole. More particularly, the invention is related to improved acoustic transmitters for use with acoustic logging-while-drilling (LWD) or measurement-while-drilling (MWD) borehole assemblies.

BACKGROUND

Acoustic logging systems are routinely used in the oil and gas industry to measure formation acoustic properties of earth formation penetrated by a well borehole. These properties include the compressional and shear velocities of the formation, which are subsequently used to determine a variety of formation parameters of interest such as porosity and pore pressure. Additionally, acoustic logging systems are used to produce acoustic images of the borehole from which well conditions and other geological features can be investigated. Other applications of acoustic logging measurements include seismic correlation and rock mechanic determination.

The downhole instrument or borehole "tool" of an acoustic logging system typically comprises one or more sources of acoustic pressure or "transmitters", and one or more acoustic receivers. The transmitters and receivers are typically spaced axially on the body of the tool. Multiple transmitters and/or receivers can also be disposed at different radial positions around the tool. A portion of the energy emitted by the one or more transmitters propagates through formation material surrounding the borehole, and is subsequently detected by the one or more receivers. Receiver response is then used to determine properties and parameters of interest.

Typical frequencies used for monopole acoustic tools are between 5 to 20 kiloHertz (KHz). It is desirable to have a transmitter that has the highest possible output at the desired frequency. There are many limitations of achieving this in down-hole tools. The more significant limitations are discussed briefly as follows.

The output of an acoustic transmitter is a function of the physical dimensions of the transmitting element such as piezoelectric material. A typical (LWD) tool, which is typically a drill collar, has a wall thickness of less than 3 inches (7.6 centimeters) and an outer diameter of about 7 inches (17.8 centimeters). If the transmitter is disposed within the wall of the tool, less than half of the wall thickness and a maximum of 2 inches (5.0 centimeters) of the perimeter of the collar can be due to structural restrictions. These restrictions set the maximum dimensions of a transmitter that can be used in an LWD tool.

The frequency of a transmitter comprising a piezoelectric crystal is a function of the physical dimensions of the transmitter. The size required to achieve the desired frequency determines the dimensions of a transmitter and hence limits its output.

Space required to fasten, seal, and mechanically and electrically isolate a transmitter in logging tool of any type adds additional limiting factors to the transmitter dimensions and therefore to the transmitter outputs. In addition, the transmitter must be covered to protect it from mechanical damage during drilling operations that include handling, drilling and tripping of the drill string.

In summary, a transmitter comprising one or more piezoelectric crystal elements, or a "piezoelectric transmitter", must be dimensioned and geometrically configured to operate within a tool in harsh borehole conditions. The structure required to operationally dispose the transmitter within the tool (such as a drill collar) imposes additional transmitter dimensional restrictions that, in turn, affect energy and frequency output of the transmitter. There is, therefore, a need for a monopole transmitter with optimized acoustic pressure output, with output frequency optimized to fall within a desired frequency range, and with a physical configuration suitable to meet structural restrictions of LWD and MWD logging systems.

SUMMARY OF THE INVENTION

The invention is a monopole acoustic transmitter consisting of a ring that comprises one or more piezoelectric arc segments. The ring is oriented in a plane whose normal is essentially coincident with the major axis of a logging tool in which it is disposed. Piezoelectric rings have been used in transmitter assemblies of wireline acoustic tools. First, a ring shaped transmitter lends itself to the wireline tool geometry. A typical wireline tool has a relatively thin housing and a transmitter ring can be easily installed in the center of the tool. Second, the diameter of a wireline acoustic tool is typically the same in wireline logging operations regardless of the borehole diameter. Since the frequency of a pressure pulse emitted by the piezoelectric ring is proportional to its diameter, the size of the ring chosen in a wireline tool provides the same frequency regardless of the borehole size. There are several restrictive challenges in disposing a piezoelectric ring transmitter in a LWD tool. In LWD systems, the tool is part of the drill collar. Typical diameters of commonly used LWD tools are 4.75, 6.75, 8.25, and 9.5 inches (12.0, 17.1, 21.0, and 23.5 centimeters), respectively. The ring element of the transmitter must be sized according to the tool diameter. Since the pressure output frequency of a ring is proportional to its diameter, rings used in different LWD tool sizes could have different output frequencies. There is also a drilling fluid or "mud" column within an LWD tool in a conduit that allows the drilling fluid to flow through the drill collar. This conduit further limits the space needed to mount a ring transmitter element in a plane perpendicular to the major axis of the tool. Another limitation is the relationship between the ring diameter and frequency of the output acoustic pressure pulse. For most piezoelectric materials, the ring diameter required to provide the desired frequency of 10 to 15 KHz is on the order of 3 to 4 inches (7.6 to 10.1 centimeters). All of the above restrictive challenges are addressed by the disclosed piezoelectric ring acoustic transmitter for LWD tools. The piezoelectric ring acoustic transmitter in this disclosure is disposed within a recess on the outer surface of a short, cylindrical insert. The insert is inserted into the collar, rather than into the wall of the collar, from the "downhole" end. The insert further comprises electronics required to operate and control the transmitter.

The collar serves as a pressure housing for the tool. In addition, the insert has first and second external electronic connectors. The first connectors are oriented toward a receiver section of the LWD tool, and the second connectors are oriented toward the bottom or "downhole" end of the collar. Standard wiring passing through the collar passes through the transmitter insert to the bottom of the collar. In addition, at least one wire to control the transmitter is passed from the receiver section to the transmitter. The transmitter insert is mounted to the collar using O-rings or other pressure sealing structures to pressure seal elements of the transmitter from the borehole environs and to further hold the insert securely within the collar.

One or more openings in the wall of the collar provide a path of pressure pulses from the transmitter to pass into the borehole environs. A tradeoff between the number, dimensions, and location of the openings is made to obtain the best measurement and the highest output possible while still maintaining mechanical integrity of the collar structure. For example, having four large openings spaced azimuthally at 90 degrees from each other maximizes the pressure signal amplitude but can result in signal distortion at a receiver array due to the different paths acoustic pressure waves take to arrive at a receiver array aligned azimuthally and disposed on the side of the receiver section of the collar. This effect can be minimized by matching the number and azimuthal location of the receiver elements to the number and azimuthal location of the openings.

An alternative embodiment uses a segmented piezoelectric ring instead of a continuous piezoelectric ring. A segmented ring consists of segments of piezoelectric ceramic bonded to segments of other materials such as alumina to increase the frequency or heavy metals such as tungsten to reduce the frequency. The material and dimensions of the material used between the piezoelectric segments is chosen to alter the frequency of the ring. All piezoelectric segments of only a selected number of segments can be activated depending upon the application. Another embodiment uses a continuous piezoelectric ring on which certain arc segments are polarized or polled. This is accomplished by applying, to the surfaces of the ring, bands or "stripes" of electrode material. The entire striped ring is activated simultaneously.

One of the major advantages of using a piezoelectric ring transmitter oriented as previously defined is the optimization of acoustic pressure pulse output. Even with some of the ring output blocked by the tool wall or deactivated in a segmented ring comprising non piezoelectric material, the formation signal from a ring transmitter is still higher than other types of transmitters that can be mounted in the wall of a drill collar.

The piezoelectric ring, oriented with its normal essentially coincident with the major axis of the logging tool excited in the hoop mode, emits an acoustic pressure signal along the diameter of the ring. The signal from the ring is along the transverse direction perpendicular to the normal of the ring. This signal directionality is optimal for acoustic logging measurements. For logging tools varying in diameter from 4.75 inches (12.1 centimeters) to 7.0 inches (17.8 centimeters), output frequencies between 8 to 12 KHz are obtained. This frequency range is adequate for essentially all borehole diameters logged with LWD acoustic systems.

The fact that a ring is mounted inside the drill collar and the sound waves are emitted only through openings in the collar causes part of the signal to transmit directly into the collar body. This can cause an increase in tool mode signal, which is undesirable. Several methods can be used to reduce this effect.

One of the major advantages of using a ring transmitter is its optimization of signal output. Even with some of the ring signal blocked by the tool body or deactivated in a segmented ring, the pressure signal reaching the borehole environs is still typically greater than other types of transmitters that are be mounted within or in the wall of a drill collar.

BRIEF DESCRIPTION OF THE DRAWINGS

The manner in which the above recited features and advantages, briefly summarized above, are obtained can be understood in detail by reference to the embodiments illustrated in the appended drawings.

DETAILED DESCRIPTION OF THE PREFERRED EMBODIMENTS

An acoustic LWD logging tool typically comprises one or more acoustic transmitters and one or more acoustic receivers.

Figure 1:
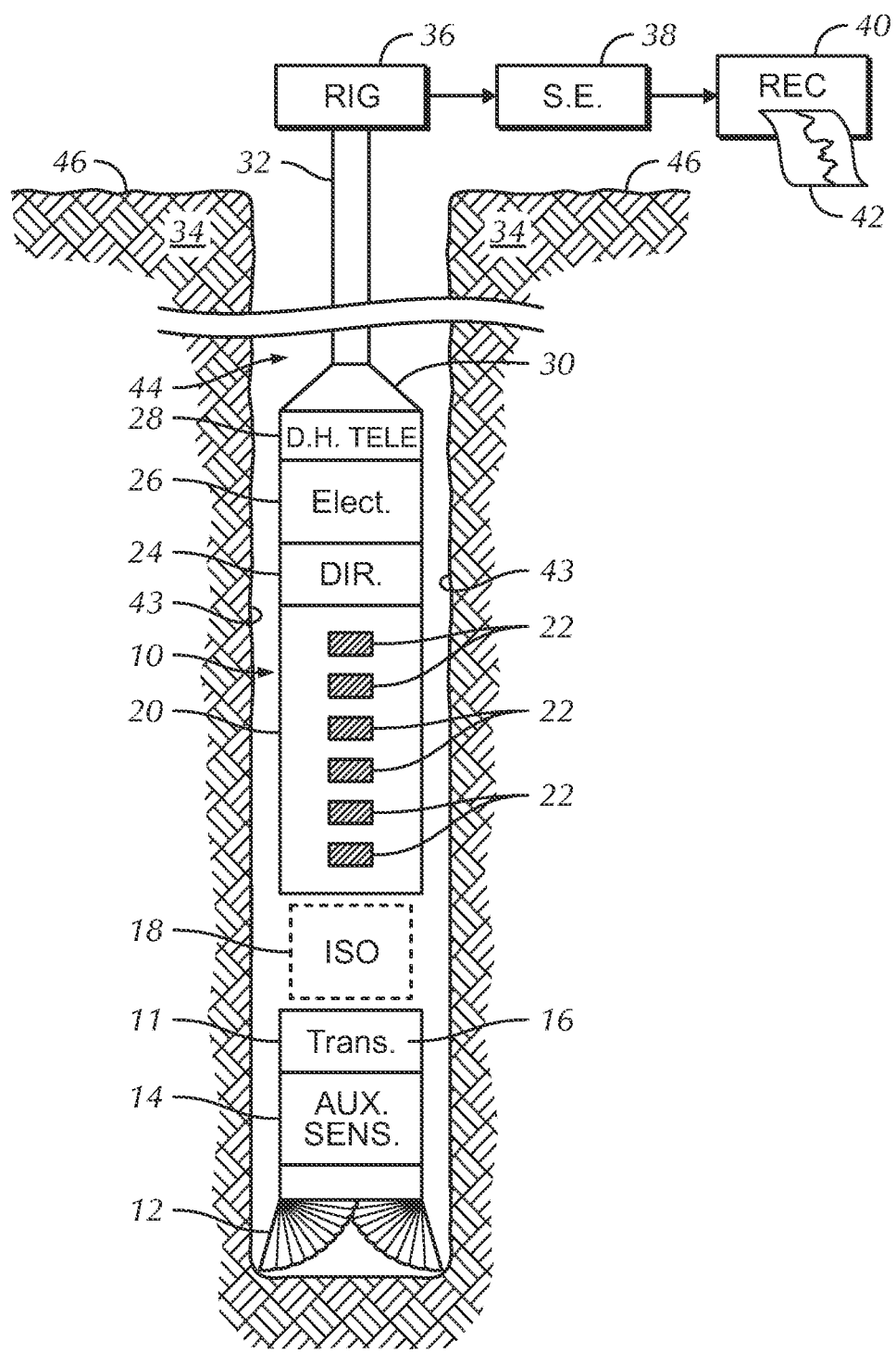
FIG. 1 illustrates the piezoelectric ring transmitter within a LWD acoustic system disposed in a borehole drilling environment.

FIG. 1 illustrates a piezoelectric ring acoustic transmitter disposed within a LWD logging system operating in a borehole drilling environment. The LWD borehole instrument or "tool" component of the borehole assembly is designated as a whole by the numeral 10, and comprises a tool pressure housing 11 which is typically a drill collar. The tool 10 is disposed within a well borehole 44 defined by borehole walls 43 and penetrating earth formation 34. A drill bit 12 terminates a lower end of the tool 10, and a connector 30 terminates an upper end of the tool. The connector 30 operationally connects the tool 10 to a lower end of a drill string 32. The upper end of the drill string terminates at a rotary drilling rig 36, which is known in the art and is illustrated conceptually at 36.

Again referring to FIG. 1, the tool 10 comprises a transmitter section 16 and a receiver section 20. The transmitter section is an insert that is mounted within the drill collar 11. The receiver section 20 comprises a plurality of receivers 22 disposed in the wall of the drill collar 11 and axially spaced from the transmitter section 16. Six receivers are illustrated, although more or fewer receivers can be used. The receivers 22 are also shown axially aligned, although axial alignment is not required as will be discussed in a subsequent section of this disclosure. Since the transmitter section 16 is mounted inside the drill collar 11, a portion of the transmitter pressure pulse signals that are emitted through one or more openings in the collar into the borehole environs. Furthermore, another portion of this signal to transmit directly into the body of the drill collar 11. This results in an increase in tool mode signal at the receivers 22, which is undesirable. Several isolation apparatus and methods can be used to isolate the tool mode. An isolation structure is illustrated conceptually at 18, and various isolation options will be discussed in a subsequent section of this disclosure.

Still referring to FIG. 1, the tool 10 can comprise other elements that can be used to complement measurements made with the acoustic transmitter section 16 and the receiver section 20. In the embodiment shown in FIG. 1, the tool comprises an optional directional section 24 that provides a real time measure of azimuthal angle therefore provides azimuthal orientation of the tool 10 within the borehole 44. The tool 10 can optionally comprise an auxiliary sensor section 14 with one or more auxiliary sensors responsive to a variety of borehole environs parameters. It should be understood that operation of the monopole acoustic transmitter disclosed herein does not require measurements from the directional section 24 or from the auxiliary sensor section 14. Once again referring to FIG. 1, an electronics section 26 provides power and control circuitry for the acoustic transmitter section 16, receiver section 20, the optional directional section 24, and any optional auxiliary sensors in the auxiliary sensor section 14. Power is typically supplied by batteries, but may be supplied by a mud powered turbine generator (not shown). The electronics section 26 is operationally connected to a down-hole telemetry unit 28. Data from elements within the tool 10, whether processed downhole as parameters of interest or in the form of "raw" data, are telemetered to the surface 46 of the earth by means of a suitable telemetry system. Suitable telemetry systems include a mud pulse system, and electromagnetic telemetry system, or an acoustic telemetry system that uses the drill string 32 as a data conduit. The telemetered data are received by an up-hole telemetry element (not shown) preferably disposed in a surface equipment module 38. As the borehole assembly comprising the logging tool 10 is conveyed along the borehole 44 by the drill string 32, one or more parameter of interest, or alternately raw data, are input to a recorder 40. The recorder 40 tabulates and optionally stores the data as a function of depth within the borehole 44 at which they are measured. The recorder output 42 is typically a "log" of the data as a function of borehole depth. The data can alternately be recorded in down-hole processor memory (not shown), and subsequently downloaded to the surface equipment module 38 when the tool 10 is returned to the surface 46 during or after the drilling operation is completed. The downloaded data are typically processed further within the surface equipment module 38 to obtain additional parameters of interest that cannot be determined in the down-hole processor unit.

As stated previously, the tool housing 11 is typically a steel drill collar with a conduit through which drilling fluid flows.

The monopole acoustic transmitter disclosed herein comprises a transmitter ring comprising one or more piezoelectric elements.

Figure 2A:
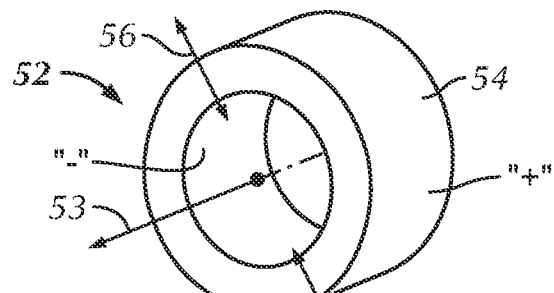
FIG. 2a is a perspective view of a "continuous" ring embodiment of the acoustic transmitter ring comprising a single loop of piezoelectric material.

A first embodiment of the transmitter ring 52 is illustrated in perspective in FIG. 2a and comprises a single loop of piezoelectric material 54. This embodiment of the transmitter ring will be referred to as a "continuous" ring embodiment. The polarization of the ring is indicated by "+" and "−". Electrical connections to the piezoelectric material 54 (see FIG. 3) are such that the ring 52 expands or contracts upon application of a voltage. As an example, a positive voltage applied the outer and inner surfaces of the ring 52 expands the ring outward in the radial direction, while a negative voltage contracts the ring in the axial direction. This expansion and contraction is illustrated conceptually by the arrows 56. The normal of the transmitter ring, in this and other disclosed embodiments, is illustrated by the arrow 53.

Figure 2B:
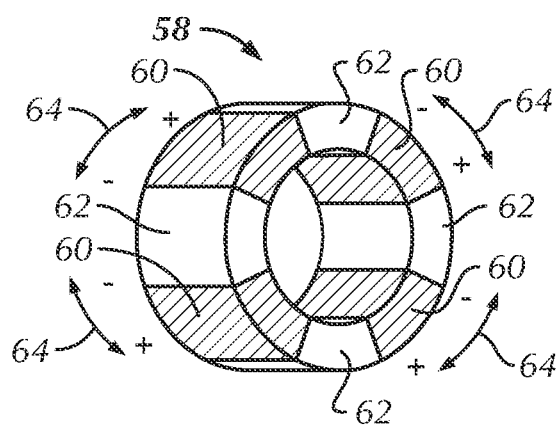
FIG. 2b is a perspective view of a "segmented" ring embodiment of the acoustic transmitter ring comprising a plurality of arc segments of piezoelectric material bonded to intervening arc segments of non piezoelectric material.

A second embodiment of the transmitter ring 58 is illustrated in perspective in FIG. 2b, and comprises a plurality of arc segments 60 of piezoelectric material with intervening arc segments 62 of material. This embodiment will be referred to as a "segmented" ring. For a given ring dimension, intervening arc segments 62 of relatively light material, such as alumina, increase output frequency. Conversely, intervening arc segments of relatively heavy materials, such as tungsten, decrease output frequency. The polarization of each segment 60 of each piezoelectric segment is again indicated by "+" and "−". Electrical connections are such that the same voltage is applied simultaneously to each piezoelectric segment 60. Each segment 60 expands and contracts simultaneously in an azimuthal direction illustrated conceptually by the arrows 64.

Figure 2C:
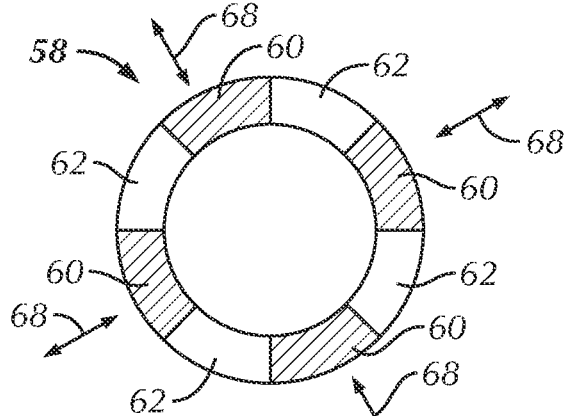
FIG. 2c is a cross sectional view of the segmented ring embodiment.

FIG. 2c is a cross sectional view of the segmented ring embodiment 58. Since all segments are rigidly bound to one another, the azimuthal expansions and contractions (see arrows 64) of the piezoelectric segments 60 result in a radial expansion and contraction of the segmented ring 58. The ring expansion and contraction is illustrated conceptually by the arrows 68.

Figure 2D:
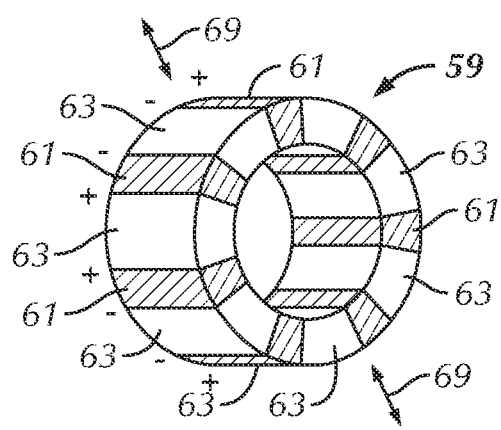
FIG. 2d is a perspective view of a "striped" ring embodiment showing stripes of electrode material applied to the surface of a continuous piezoelectric ring.

FIG. 2d illustrates the "striped" ring embodiment 59. The embodiment comprises continuous ring piezoelectric ring 63 on which active arc segments are polarized or polled. This is accomplished by applying, to the surfaces of the ring 63, bands 61 or "stripes" of electrode material 61 thereby defining active arc segments. The active arc segments of piezoelectric material are polarized by the bands of electrode material 61 as indicated by "+" and "−" annotations. The entire striped ring 59 is activated simultaneously, as opposed to the segmented ring embodiment 58 in which certain segments of piezoelectric material can be activated independently. The acoustic pressure signal in the hoop mode, indicated conceptually by the arrows 69, is greater than a continuous ring 52 of identical dimensions and applied voltages.

Figure 3:
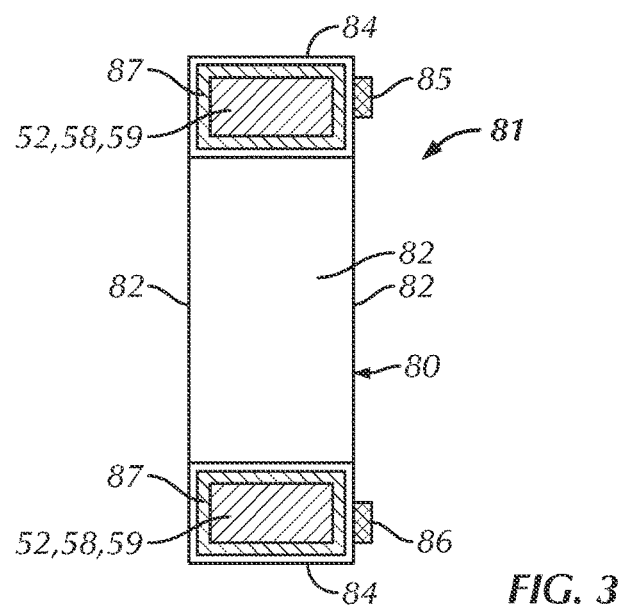
FIG. 3 shows a transmitter ring assembly comprising a continuous or segmented piezoelectric ring that is disposed within a ring pressure compensation housing.

FIG. 3 shows a cross sectional view of a transmitter ring assembly 81. A continuous 52, striped, or segmented piezoelectric ring 58, or a striped piezoelectric ring 59 is disposed within a ring pressure compensation housing 80, as shown in FIG. 3. The outer wall 84 of the ring pressure compensation housing 80 is preferably thinner than the side and inner walls 82. This optimizes radial acoustic pressure transmission into the borehole environs. High pressure connector 85 electrically connects the piezoelectric ring to the transmitter electronics (see FIGS. 4 and 5) which connect electronically to the electronics section 26 of the tool 10 (see FIG. 1). The ring pressure compensation housing 80 is filled with high dielectric oil 87 to balance the borehole pressure through a pressure compensator 86 such as a piston, bellows, diaphragm or the like. The pressure compensation housing 81 is sealed so that drilling fluids cannot enter the chamber and short circuit poles connected to the piezoelectric ceramic in the electrical connector 85.

Figure 4:
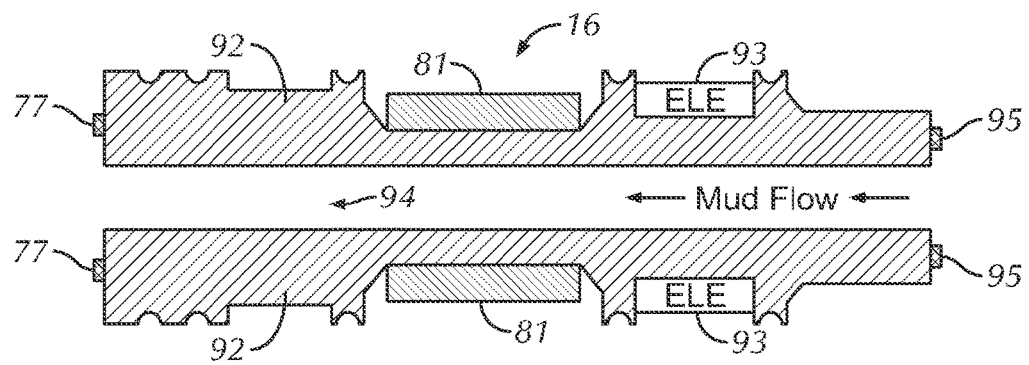
FIG. 4 shows an acoustic transmitter comprising the transmitter ring assembly disposed on a short insert.

FIG. 4 is a cross sectional view of the acoustic transmitter 16 comprises the transmitter ring assembly 81 disposed on a short cylindrical insert 92. The transmitter ring assembly 81 is disposed within a recess in an outer surface of the insert 92 with the normal 53 of the transmitter ring assembly essentially coincident with the major insert axis of the insert. The insert is fabricated from stainless steel or other material suitable for operation in harsh borehole conditions. Drilling fluid flows through a conduit 94 that is essentially coincident with the major axis of the insert 92. The insert 92 further comprises a transmitter electronics element 93 that cooperates with the electronics section 26 (see FIG. 1) to operate and control the transmitter 16. In addition, the insert 92 has first and second external electronic connectors. The first connectors 95 are oriented toward the receiver section 20 of the LWD tool 10, and the second connectors 97 are oriented toward the bottom or "downhole" end of the drill collar 11.

Figure 5:
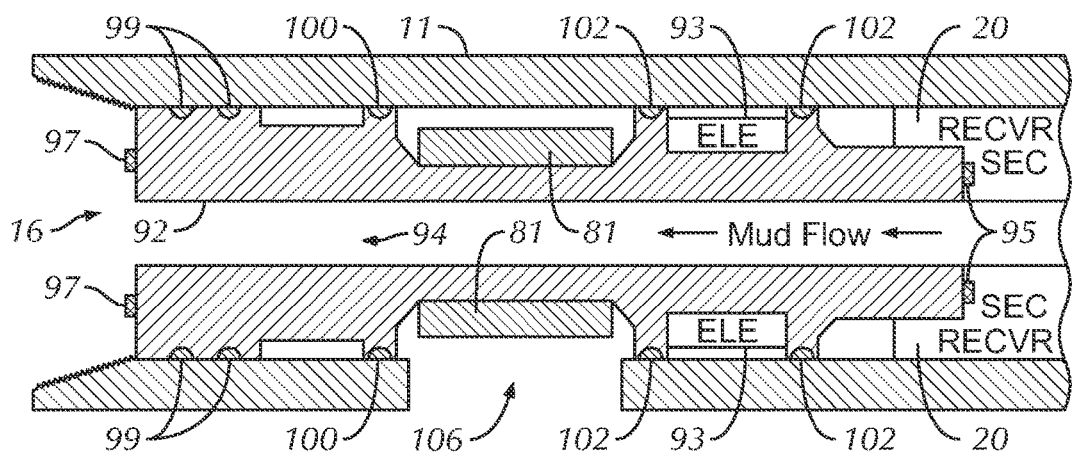
FIG. 5 illustrates the acoustic transmitter within a drill collar.

FIG. 5 is a cross sectional illustration of the transmitter 16 disposed within the drill collar 11. Standard wiring (not shown in FIG. 5) passing through the collar 11 passes through the transmitter 16 to the bottom of the collar. In addition, at least one wire to control the transmitter 16 via the transmitter electronics element 93 and electronics section 26 is passed from the receiver section 20 to the transmitter 16. Connectors 95 and 97 provide electrical connections between the electronics section 26 and additional tool sections, such as an auxiliary sensor section 14, shown in FIG. 1. The transmitter insert 92 is mounted using O-rings or other mechanism to hold it securely within the drill collar 11, as will be detailed subsequently. The drill collar 11 has at least one opening 106 exposing the transmitter ring assembly 81 to the borehole and thereby providing a radial path for pressure waves emitted by the transmitter ring assembly to enter the borehole environs.

As shown in axial cross section of FIG. 5, the "downhole" or drill bit end of the borehole assembly is to the left. O-rings 99, 100 and 102 hold the insert 92 securely within the collar 11. O-rings 99 and 100 also seal the interior of the tool 10 from borehole environs to which the transmitter ring assembly 81 is exposed through the opening 106. O-rings 102 likewise seal the "uphole" portion of the tool 10, including the transmitter electronics element 93, from the borehole environs. It should be understood that other sealing elements can be used to perform the sealing and position securing functions.

FIG. 5 shows the transmitter section 16 electrically and physically connected to the receiver section 20. It is preferred to isolate the transmitter and receiver sections, as will be discussed in a subsequent section of this disclosure.

Figure 6A:
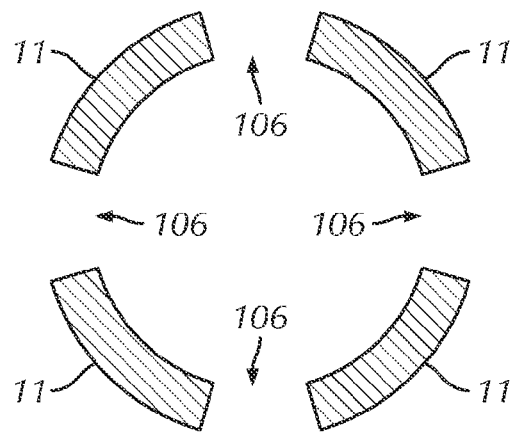
FIG. 6a is a cross sectional view of the drill collar at the transmitter assembly ring with four openings spaced at 90 degrees and through which acoustic pulses from the transmitter enter the borehole environs.

As mentioned previously, one or more openings 106 (see FIG. 5) in the wall of the collar 11 and axially aligned with the transmitter ring assembly 81 provide a path for pressure pulses or waves from the transmitter ring assembly to pass into the borehole environs. A tradeoff between the number and location of the openings 106 is made to obtain the best acoustic measurement and the highest acoustic output possible into the borehole environs. FIG. 6a is a cross sectional view of a collar 11 at the transmitter ring assembly 81 (not shown) with four openings 106 at 90 degrees from each other. This embodiment maximizes the output signal amplitude, but can result in received signal distortion due to the different paths acoustic pressure waves could take to arrive at receivers 22 if they are azimuthally aligned as shown in FIG. 1.

Figure 6B:
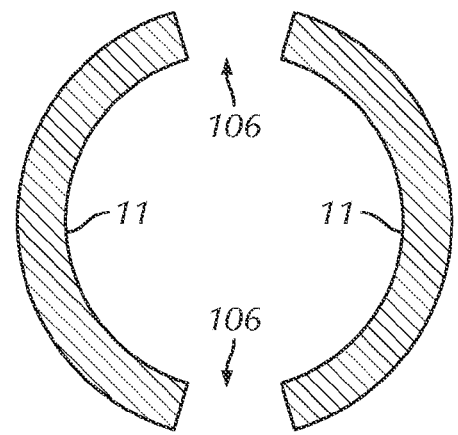
FIG. 6b is a cross sectional view of a drill collar at the transmitter assembly ring with two larger openings spaced at 180 degrees and through which acoustic pulses from the transmitter enter the borehole environs.

Recall that the receivers 22 are disposed in the wall of the drill collar 11. Received signal distortion can, therefore, be minimized by azimuthally matching the number and location of the receivers 22 to the number and location of the openings 106. Stated another way, the receiver array will comprise four receivers 22 (or four groups of receivers) disposed at 90 degree azimuthal spacings around the receiver section 20, with each receiver (or receiver group) being aligned azimuthally with a corresponding opening. FIG. 6b is a cross sectional view of a collar 11 with two openings 106 azimuthally spaced at 180 degrees. The opens are azimuthally larger than those shown in FIG. 6a. Once again, received signal distortion is minimized by azimuthally matching the number and location of the receivers 22 to the number and location of the openings 106. Although preferred, the dimensions and azimuthal spacings of multiple openings need not be equal. Finally, if a single receiver 22 embodiment is used, a single opening (not shown) in the collar is azimuthally aligned with the single receiver to minimize received signal distortion.

Tool Mode Considerations

As discussed previously, the transmitter ring assembly 81 is mounted inside the drill collar 11. A portion of the emitted acoustic pressure signal is emitted radially through one or more openings 106 in the collar. Another portion of the emitted acoustic pressure signal is transmitted directly into the collar body. This can cause an increase in tool mode signal, which is undesirable. There are several ways of reducing this effect.

A tool mode isolator can be disposed between the transmitter section 16 and the receiver section 20. The following techniques can be used reduce the tool mode signal. The transmitter ring assembly 81 can be acoustically isolated from the insert 92 using materials such as tungsten-loaded rubber. The transmitter insert 92 can be acoustically isolated from the collar 11 using various acoustic isolation materials. If a segmented transmitter ring 58 is used, the piezoelectric segments 60 can be made to correspond to the openings 106 in the collar 11. Since the other segments 62 are not active, the acoustic signal emitted directly into the collar 11 will be greatly reduced. All of the above techniques are represented conceptually as an "acoustic isolator" at 18 of FIG. 1.

Output and Frequency Considerations

Since the pressure output frequency of a piezoelectric ring is proportional to its diameter, rings used in different LWD tool sizes can have different output frequencies. There is also the drilling fluid conduit 94 within the insert 92 with a major axis essentially coincident with the major axis of the tool 10. The conduit 94 limits the space needed to mount the transmitter ring assembly 81 in a plane essentially perpendicular to the major axis of the tool 10. Another limitation is the relationship between the ring diameter and output frequency. For most piezoelectric materials, the ring diameter required to provide the desired frequency of 10 to 15 KHz is on the order of 3 to 4 inches (7.6 to 10.2 centimeters).

Considering the previously described physical constraints, one of the major advantages of using a piezoelectric acoustic ring transmitter disposed inside of a drill collar 11 is pressure output optimization. Measurements show that a 4 inch (10.2 centimeter) outside diameter ring provides more than 3 KiloPascals (KPa) of pressure at 39.4 inches (1.0 meter) when excited with 1000 volt pulse. These output parameters are desirable for acoustic logging applications. Even with some of the transmitter ring output signal blocked by the collar 11 or deactivated in a segmented ring 58, the formation signal from a ring transmitter 16 is still greater than other types of transmitters that must be mounted within the wall of a drill collar.

Depending on the piezoelectric material, a 12 KHz frequency, which is ideal for monopole logging measurements, is obtained from 3.0 to 3.5 inch (7.6 to 8.9 centimeters) outside diameter ring. The following table shows ring frequencies that can be obtained in different LWD tools, where the tool size dimension (in inches) is the outside diameter of the tool shown in FIG. 1.

| Tool Size (in) | Inner Ring Diameter (in) | Outer Ring Diameter (in) | Nominal Frequency (KHz) |
| --- | --- | --- | --- |
| 4.75 | 2.85 | 3.25 | 12 |
| 6.75 | 3.4 | 3.9 | 10 |
| 8.25 | 4.25 | 4.75 | 8 |
| 9.5 | 4.25 | 4.75 | 8 |

For a 4.75 inch (12.07 centimeter) diameter of the tool 10, the desired 12 KHz frequency can be easily obtained. For a 6.75 inch (17.15 centimeter) tool diameter, a frequency of 10 KHz can be obtained, which is still within the range of monopole measurements. For the 8.25 and 9.5 inch (20.1 and 24.1 centimeters) tool diameters, a maximum of 8 KHz can be obtained from a ring transmitter ring assembly 81 that is mounted inside the drill collar 11 as shown in this disclosure. Although this is less than optimum, these tools are typically used to drill 12 to 17 inch (30.5-43.2 centimeter) diameter boreholes, and a lower frequency transmitter may be desirable to provide deeper radial depth of investigation.

Signal Directionality

Figure 7:
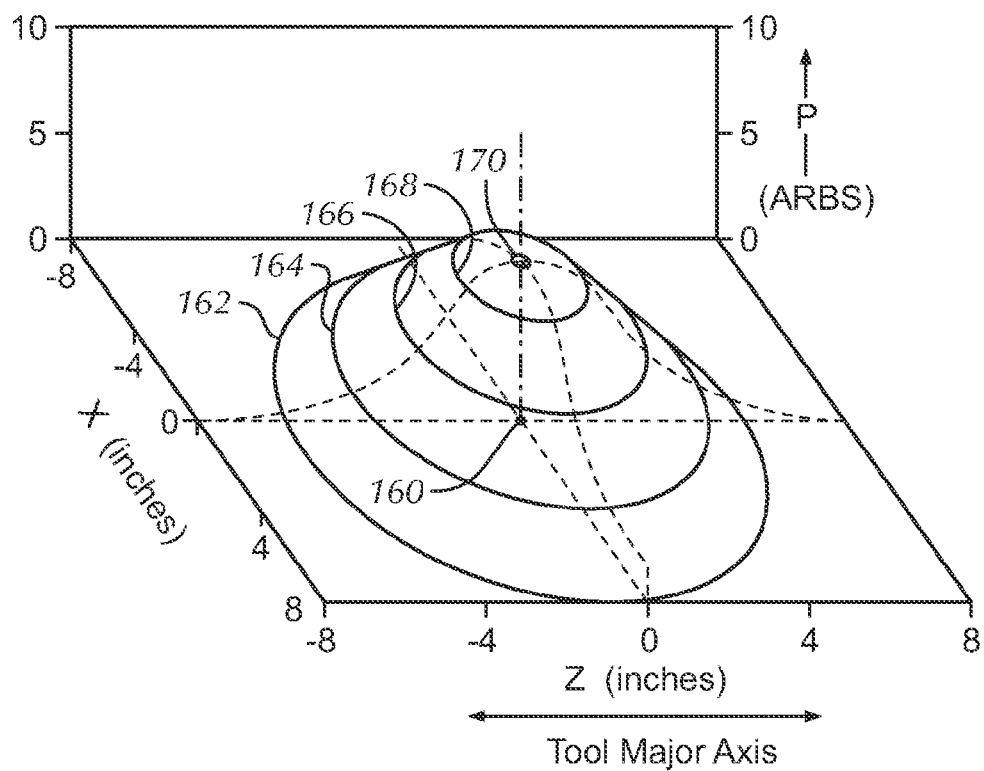
FIG. 7 illustrates the pressure beam pattern of the piezoelectric ring transmitter.

The pressure beam pattern of a piezoelectric ring transmitter 16 is shown in FIG. 7, which is a perspective illustration of pressure P (arbitrary units) output along the x and z axes. The z axis is coincident to the major axis of the logging tool 10. A ring transmitter excited in the hoop mode emits a signal that is maximum perpendicular to the diameter of the ring. This direction is denoted as the x axis. The transmitter ring assembly 81 is located at coordinate (0,0) as indicted at 160, with its normal coincident with the z axis. The magnitude of pressure output as a function of x and z is denoted by contours 162, 164, 166, 168 representing increasing values of P, with the maximum 170 of P at (0,0). The pressure output from the piezoelectric ring transmitter 16 is, therefore, optimal along the transverse direction (x axis), which is optimal for acoustic logging measurements.

The above disclosure is to be regarded as illustrative and not restrictive, and the invention is limited only by the claims that follow.

What is claimed is:

1. A LWD logging tool acoustic transmitter comprising:
a transmitter ring comprising a single, continuous arc segment of piezoelectric material upon which bands of electrode material have been applied to a surface of the single arc segment of piezoelectric material; wherein
the ring is disposed within a transmitter ring assembly that is disposed within an insert comprising a flow conduit, is disposed within a drill collar rather than into a wall of the drill collar of the logging tool;
the normal of said ring is essentially coincident with the major axis of the logging tool; and
the single, continuous arc segment of piezoelectric material is polarized and configured electrically to emit a pressure pulse perpendicular to the normal upon application of a voltage to at least one of the bands of electrode material.

2. The transmitter of claim 1 wherein the transmitter ring assembly comprises a ring pressure compensation housing in which the ring is disposed.

3. The transmitter of claim 2 further wherein:
the insert with the flow conduit therein is coincident with a major insert axis of the insert;
the transmitter ring assembly is disposed within a recess in an outer surface of the insert; and
the normal is essentially coincident with the insert major axis.

4. The transmitter of claim 3 wherein:
the insert is disposed within the collar with the insert major axis essentially coincident with the major axis of the collar; and
the ring is axially aligned with at least one opening in the collar.

5. The transmitter of claim 1 wherein:
the outer diameter of said ring is about 3 to 4 inches;
the output frequency of said transmitter is 8 to 15 kHz; and
the pressure output of said transmitter is 2 to 4 kiloPascals (kPa) at 40 inches when said ring is excited with about volt pulse.

6. A method of emitting pressure pulses into a borehole from a LWD logging tool, the method comprising:
disposing within the borehole a transmitter ring comprising a single, continuous arc segment of piezoelectric material upon which bands of electrode material have been applied to a surface of the single arc segment of piezoelectric material;
disposing the ring within a transmitter ring assembly;
disposing the transmitter ring assembly within an insert comprising a flow conduit therethrough and being disposed within a drill collar rather than into a wall of a drill collar of the logging tool; wherein:
the normal of the ring is essentially coincident with the major axis of the logging tool; and
the single, continuous arc segment of piezoelectric material is polarized and configured electrically to emit a pressure pulse perpendicular to the normal upon application of a voltage to at least one of the bands of electrode material; and
disposing the transmitter ring assembly within a drill collar of the logging tool.

7. The method of claim 6 wherein the transmitter ring assembly comprises a ring pressure compensation housing.

8. The method of claim 7 further comprising:
aligning the insert with a flow conduit therein along a major insert axis of the insert; and
disposing the transmitter ring assembly within a recess in an outer surface of the insert;
wherein said normal is essentially coincident with said insert major axis.

9. The method of claim 8 further comprising:
disposing the insert within the collar with the insert major axis essentially coincident with the major axis of the collar; and
axially aligning the ring with at least one opening in the collar.

10. The method of claim 6 further comprising:

fabricating the ring with an outside diameter of 3 to 4 inches;

operating the transmitter at an output frequency of 8 to 15 kHz; and providing a pressure output of the transmitter of 2 to 4 kiloPascals (kPa) at 40 inches when the ring is excited with 1000 volt pulse.

11. A LWD logging tool acoustic transmitter comprising:

a transmitter ring comprising a single continuous arc segment of piezoelectric material upon which bands of electrode material have been applied to a surface of the single arc segment of piezoelectric material;

wherein the ring is disposed within a transmitter ring assembly comprising a ring pressure compensation housing containing high dielectric oil and a pressure compensator;

an insert with a flow conduit therein along a major insert axis of the insert, wherein the transmitter ring assembly is disposed within a recess in an outer surface of said insert; and the normal of the ring is essentially coincident with the insert major axis; wherein the insert is disposed within a drill collar of a logging tool with the normal of the ring essentially coincident with the major axis of the logging tool;

the single continuous arc segment of piezoelectric material is polarized and configured electrically to emit a pressure pulse perpendicular to the normal upon application of a voltage to at least one of the bands of electrode material; and the ring is axially aligned with at least one opening in the collar.

* * * * *